United States Patent Office 3,784,511
Patented Jan. 8, 1974

---

3,784,511
COLOR STABILIZATION OF FIBERS FROM ACRYLONITRILE POLYMERS
James Ray Kirby, Durham, N.C., assignor to Monsanto Company, St. Louis, Mo.
No Drawing. Filed Mar. 28, 1972, Ser. No. 238,958
Int. Cl. C08f 45/58, 45/62
U.S. Cl. 260—45.95 P          3 Claims

ABSTRACT OF THE DISCLOSURE

Color stabilization of acrylonitrile-containing polymers may be accomplished through treating acrylonitrile-containing polymers and articles formed therefrom with an organophosphorus compound not exceeding 5 weight percent of said polymer, said compound having the general formula:

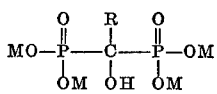

wherein M is a member selected from the group consisting of hydrogen, sodium, lithium, potassium, and R is a member selected from the group consisting of an alkyl radical having one to eleven carbon atoms, a phenyl radical, and an alkyl phenyl radical no more than eight carbon atoms.

BACKGROUND OF THE INVENTION

(a) Field of the invention

This invention relates to the stabilization of polymers of acrylonitrile. More particularly, this invention relates to a color stabilization, especially on exposure to heat, of polymers and articles formed therefrom containing at least 60 weight percent acrylonitrile.

(b) Description of the prior art

Acrylonitrile homopolymers, copolymers, and interpolymers containing at least 60 percent or more acrylonitrile are generally insoluble in the more common solvents. Even in suitable solvents, the rate of solution at ambient temperature is low. In order to effect solution, heat is generally applied which often results in a darkening of the polymer solution, an undesirable effect which becomes more noticeable upon standing for prolonged periods of time. It is believed that the presence of certain substance and, in particular, certain ions, such as iron, copper, and manganese in trace concentrations, contribute to this darkening effect. The employment of the commonly used solvent, dimethylacetamide, may further intensify the coloration. Further, it is believed that several impurities often present in such solvents also add to this effect. Regardless of the reason of this coloration, the formed compositions and products have undesirable qualities and, therefore, are commercially unsuitable. A number of organic additives have been used in an attempt to resolve this problem. Certain optical whitening agents have been used in conjunction with spinning solutions with some degree of success. It is realized that the use of such agents do not actually remove the factors which cause discoloration and, therefore, do not actually resolve the color stabilization problem. Further, a number of processes have been employed using various sequestering agents in the washing process which, in effect, remove metallic ions. Ethylenediaminetetracetic acid is a well-known sequestering agent and has been employed as a dope additive for removing trace amounts of metal ions from acrylonitrile polymer articles. Aside from the requirement of thorough washing to remove this particular organic acid, it is found that salts of it are poorly soluble in organic solvents employed for the production for acrylonitrile polymers and often cause fouling of heat exchangers when the solvent is recovered by distillation.

SUMMARY OF THE INVENTION

A product and process has been discovered which is advantageous in several respects over the prior art, particularly with regard to its markedly improved color stabilization upon exposure to heat.

Accordingly, one aspect of the present invention is to prevent undesirable color formation of acrylonitrile polymer compositions.

Another aspect is to minimize color formation when solutions of acrylonitrile-containing polymers are permitted to stand for a prolonged period of time or upon application of heat.

It is also an aspect of the subject invention to prevent color formation in acrylonitrile fibers at elevated temperatures.

A still further aspect of the invention is the production of solutions of acrylonitrile polymers and articles produced therefrom having improved color characteristics.

Other aspects and objects will be apparent from a consideration of the description of the invention herein.

In general, the objects of this invention are accomplished by forming an acrylonitrile polymer, and contacting the polymer with an organophosphorus compound not exceeding five weight percent of said polymer, said compound having the general formula:

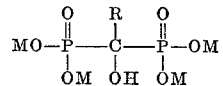

wherein M is a member selected from the group consisting of hydrogen, sodium, lithium, potassium, and R is a member selected from the group consisting of an alkyl radical having one to eleven carbon atoms, a phenyl radical, and an alkylphenyl radical no more than eight carbon atoms.

The organophosphorus compound may be contacted with acrylonitrile polymers in a reaction vessel immediately after their production. Thus, the organophosphorus compound and newly formed polymers when will in a slurry may be mixed, the mixing being carried out by any suitable means adapted to thoroughly disseminate the materials. The treated polymer is then isolated by normal means. Another preferred method of practicing this invention involves the addition of the organophosphorus compound to the polymer solvent prior to adding the polymer since in this manner any color that might be developed, as by heating, will be curtailed at the moment of its formation. Further, the organophosphorus compound may be brought in contact with the freshly spun filaments prior to drying.

Among the solvents which may be used to dissolve acrylonitrile polymers in practicing the subject invention include N,N - dimethyl formamide, N,N - dimethylacetamide, ethylene carbonate, dimethyl sulfoxide, and about 55% aqueous sodium thiocyanate.

Suitable organophosphorus compounds include the following:

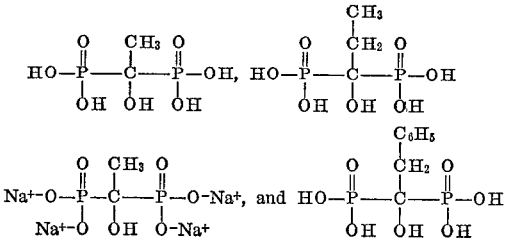

A most preferred organic phosphorus compound is 1-hydroxyethane 1,1-diphosphonic acid. It is preferred that the organophosphorus compounds of the present invention be present in a small amount compared with the amount of polymer dissolved. Thus, although the amount is not absolutely critical, it is preferred that the compound be present in the amount of about 5 weight percent or less based on the total weight of the polymer. The total amount of such compounds which may be advantageously employed in treating the acrylonitrile polymers herein is generally in the range of about 0.01 to 5 percent based on the total polymer weight.

The polymeric materials, which may be employed in the practice of the present invention, are polyacrylonitrile, copolymers, including binary, ternary, and multicomponent polymers containing at least 60 percent by weight of acrylonitrile in the polymer molecule, or a blend comprising polyacrylonitrile or acrylonitrile copolymers with from 2 to 50 percent of another polymeric material, the blend having an overall polymerized acrylonitrile content of at least 60 percent by weight. While the preferred polymers employed in the instant invention are those containing at least 60 percent of acrylonitrile, generally recognized as the fiber-forming acrylonitrile polymers, it will be understood that the invention is likewise applicable to polymers containing less than 60 percent acrylonitrile and the same stability is realized with the compounds defined herein. The acrylonitrile-containing polymers containing less than 60 percent acrylonitrile are useful in forming fibers, films, coating compositions, molding operations, lacquers, etc., in all of which applications the alleviation of undesirable color is important.

For example, the polymer may be a copolymer of from 60 to 98 percent acrylonitrile and from 2 to 40 percent of other monomers containing the $>C=C<$ linkage and copolymerizable with acrylonitrile. Suitable mono-olefinic monomers include acrylic, alpha-chloroacrylic and methacrylic acids; the acrylates, such as methyl acrylate, methyl methacrylate, ethyl methacrylate, butyl acrylate, methoxymethyl methacrylate, beta-chloroethyl methacrylate, and the corresponding esters of acrylic and alpha-chloroacrylic acids; vinyl chloride, vinyl bromide, vinylidene chloride, 1 - chloro - 1 - bromoethylene; methacrylonitrile; acrylamide and methacrylamide; alpha-chloroacrylamide, or monoalkyl substitution products thereof; methyl vinyl ketone; vinyl carboxylates, such as vinyl acetate, vinyl chloroacetate, vinyl propionate, and vinyl stearate; methylene malonic ester; itaconic acid and itaconic dimethyl ester; N-vinyl carbazole, vinyl furane; vinyl sulfonic acid; sodium methallyl sulfonate, sodium styrene sulfonate, sodium p-sulfophenyl methallyl ether; ethylene alpha, beta-dicarboxylic acids or derivatives, such as diethylcitraconate, diethylmesaconate, styrene, vinyl naphthalene; and other $>C=C<$ containing polymerizable materials.

The polymer may be a multicomponent polymer, for example, products obtained by the polymerization of acrylonitrile, enumerated above.

The polymers, useful in the practice of the present invention, may be prepared by any conventional polymerization procedure, such as mass polymerization methods, solution polymerization methods, or aqueous emulsion procedures. However, the preferred practice utilizes suspension polymerization wherein the polymer is prepared in finely divided form for use in the fiber fabrication operation. The preferred suspension polymerization may utilize batch procedures, wherein monomers are charged into an aqueous medium containing the necessary initiator and optionally, dispersing agents. On completion of the required polymerization time, the reactor contents are discharged and the polymer isolated. A more desirable method involves the continuous procedure in which the polymerization reaction is fed continuously with the desired monomers, initiators, and water and the product continuously withdrawn.

Initiator systems useful in preparation of these polymers include redox systems, such as $K_2S_2O_8$—$SO_2$, $$Na_2S_2O_8\text{—}NaHSO_3,$$

$NaClO_3$—$Na_2S_2O_5$, azo initiators such as bisazoisobutyronitrile, and peroxides such as t-butylperoxypivalate and lauroyl peroxide. A wide variation in the quantity of initiator is possible. For example, for 0.1 to 3.0 percent by weight based on the polymerizable monomer may be used. The initiator may be charged at the onset of the reaction, or it may be added continuously or in increments throughout the reaction for the purpose of maintaining a more uniform concentration of free radicals in the reaction mass. The latter method is preferred because it tends to make the resultant polymer more uniform in its chemical and physical properties. The articles manufactured from such polymers may be produced by well-known conventional methods, for example, the wet-spinning and dry-spinning methods for producing fibers.

Use of the organophosphorus compounds of this invention effects improvement in color characteristics in all solutions, and articles produce therefrom, of acrylonitrile polymers, particularly basic dyeable polymers—i.e., those formed from conventional initiator or redox systems having sulfur dioxide or the water soluble salts of bisulfite employed therein, as well as polymers of acrylonitrile having monomers copolymerizable therewith providing acid sites, particularly those bearing phosphoric, carboxylic or sulfonic acid functions.

The tests for fiber color, indicative of approaching whiteness, used throughout the examples consisted of measurements of purity (P), brightness (Y), and dominant wavelength (DWL) as calculated from the tristimulus values determined on a General Electric spectrophotometer. The method used was based on the Standard Observer and Coordinate System as recommended by the International Commission on Illumination, as fully set forth in the Handbook of Colorimetry published by the Technology Press, Massachusetts Institute of Technology in 1936. Although the complete specification of fiber color is dependent upon the combination of purity, brightness, and dominant wavelength, it is possible to grade the color for a series of fibers from the numerical values of brightness and purity alone provided the dominant wavelength is nearly the same. Such is the case in the examples to be cited as the dominant wavelength for the control and test samples never differed by more than 2 nm., e.g., 574–576 mm. Higher values of brightness (Y) and/or lower values of purity (P) denote an improvement in fiber whiteness. Fiber brightness and purity values were determined for the various samples, cited in the examples, in their original condition and after heating for 25 minutes at 145° C., in a circulating air oven. A perfectly white fiber would have a purity value of zero and a brightness of 100.

The compositions of the instant invention offer many advantages. For example, products formed from the polymer solutions of the instant invention are free of objectionable color and, thus, the solutions are of greater commercial value. In the preparation of the polymer solutions, heat can be applied without the danger of objectionable color. Further, in preparing such polymer solutions, heat may not only be applied without the danger of color formation but, when necessary, such solutions may be allowed to stand for prolonged periods of time and remain free of coloration. The organophosphous compounds are readily available and inexpensive. Therefore, no great increase in production cost is necessary. The compositions contacted by the compounds may be prepared without going through detailed and elaborate procedures that necessitate expensive changes in the design of the apparatus commonly used to manufacture acrylic and modacrylic polymer fibers.

The following examples are illustrative rather than limitative and all parts, proportions, and percentages are by weight unless otherwise specified.

EXAMPLE 1

A free-radical initiated batch suspension polymerization was conducted to prepare a multicomponent modacrylic polymer containing approximately 66 weight percent acrylonitrile, 20 weight percent vinylidene chloride, 11 weight percent vinyl bromide, one weight percent styrene, and two weight percent sodium p-sulfophenyl methyllyl ether. After removal of unreacted monomers by volatilization, the aqueous polymer slurry was transferred to a holding tank for temporary storage. The polymer slurry was treated by an addition of 1-hydroxyethane 1,1-diphosphonic acid, 0.2 weight percent based on polymer present, to the holding tank. The contents of the tank were thoroughly mixed by stirring. The average residence time and temperature for holding the polymer as an aqueous slurry with the addition of the 1-hydroxyethane 1,1-diphosphonic acid was approximately 10 hours at 50° C. In subsequent operations, the treated polymer was isolated in a conventional manner from the slurry by filtration, washed with deionized water, dried, ground, and transferred to storage facilities. The specific viscosity ($N_{sp.}$) of the isolated polymer was 0.16 as measured at a concentration of 0.1 gm./dl. in dimethyl formamide, containing 0.2 percent lithium chloride at 25° C.

Color properties of fiber spun from the polymer treated with 1-hydroxyethane 1,1-diphosphonic acid were determined and compared with color properties of fiber spun from an untreated polymer control of the same chemical composition. To obtain such fiber, portions of treated and untreated polymer were used separately to prepare spinning dopes that were 23% by weight polymer in dimethylacetamide. The spinning dopes were agitated at 60–70° C., for 30–40 minutes prior to being used for spinning. The dopes were spun into a mixture of dimethylacetamide and water (60–40 weight ratio) at about 50° C. The filaments thus-formed were given a 5.5× cascade orientation stretch and passed over heated godets at about 130° C. The fiber was annealed by steam treatment at 20 p.s.i. The annealed denier was 3.0. The fiber color was determined in terms of brightness and purity values for the control and test sample in their original condition and after heating for 25 minutes at 145° C., in a circulating air oven. The values for Example 1 are set forth in the Table I. The higher the brightness value and/or the lower the purity value, the better the fiber color.

EXAMPLE 2

A modacrylic polymer was prepared by the method cited in Example 1 and was similar in chemical composition and specific viscosity. The polymer was isolated in the normal manner (i.e., without the addition of any organophosphorus compound), and transferred to storage.

Four spinning dopes were prepared, using dimethylacetamide as solvent, each containing 23% by weight of the multicomponent modacrylic polymer. The first spinning dope was used as control and to the remaining spinning dopes were added 0.05, 0.10, and 0.15 percent by weight based on the polymer, respectively, of 1-hydroxyethane 1,1-diphosphonic acid. Antimony trioxide, $Sb_2O_3$, 1 percent by weight based on the polymer, was added to all dopes including the control. The spinning dopes were agitated at 60–70° C., for 30–40 minutes prior to being used for spinning. The dopes were spun into a mixture of dimethylacetamide and water (55–45 weight ratio) at about 30° C. The filaments thus-formed were given a 5.5× cascade orientation stretch and passed over heated godets at about 130° C. The fiber was annealed by steam treatment at 25 p.s.i. The annealed denier was 3.0. The degree of brightness and purity of the fibers in their original condition and after heating for 25 minutes at 145° C. in a circulating air oven is given in Table I.

EXAMPLE 3

A conventional free-radical initiated continuous polymerization procedure was used to prepare a polymer containing 88 weight percent acrylonitrile, 7 weight percent vinyl acetate, and 5 weight percent vinyl bromide. The polymer was isolated from the aqueous polymer slurry by filtration, washed with deionized water, dried, ground, transferred to storage. The specific viscosity of the isolated polymer was 0.15 as measured at a concentration of 0.1 gm./dl. in dimethyl formamide.

Three spinning dopes were prepared, using dimethylacetamide as solvent, each containing 25% by weight of the acrylonitrile-vinyl acetate-vinyl bromide terpolymer. The first spinning dope was used as control and to the remaining spinning dopes were added 0.10 and 0.20 percent by weight based on the polymer, respectively, of 1-hydroxyethane 1,1-diphosphonic acid. The spinning dopes were agitated at 60–70° C., for 20 minutes prior to being used for spinning. The dopes were spun into a mixture of dimethylacetamide and water (60–40 weight ratio) at about 30° C. The filaments thus formed were given a 6.0× cascade orientation stretch and passed over heated godets at about 130° C. The fiber was annealed by steam treatment at 35 p.s.i. The annealed denier was 16.5. The degree of brightness and purity of the fibers in their original condition and after heating for 25 minutes at 145° C., in a circulating air oven is given in Table I.

EXAMPLE 4

A conventional free-radical initiated continuous polymerization procedure was used to prepare a polymer containing 93 weight percent acrylonitrile and 7 weight percent vinyl acetate. The polymer was isolated from the aqueous polymer slurry by filtration, washed with deionized water, dried, ground, and transferred to storage. The specific viscosity of the isolated polymer was 0.15 as measured at a concentration of 0.1 gm./dl. in dimethyl formamide.

Four spinning dopes were prepared, using dimethylacetamide as solvent, each containing 25% by weight of the acrylonitrile-vinyl acetate copolymer. The first spinning dope was used as control and to the remaining spinning dopes were added 0.05, 0.10, and 0.20 percent by weight based on the polymer, respectively, of 1-hydroxyethane 1,1-diphosphonic acid. The spinning dopes were agitated at 60–70° C., for 20 minutes prior to being used for spinning. The dopes were spun into a mixture of dimethylacetamide and water (57–43 weight ratio) at about 40° C. The filaments thus-formed were given a 5.3× cascade orientation stretch and passed over heated godets at about 130° C. The fiber was annealed by steam treatment at 35 p.s.i. The annealed denier was 3.0. The degree of brightness and purity of the fibers in their original condition and after heating for 25 minutes at 145° C., in a circulating air oven is given in Table I.

TABLE I

| Example | Wt. percent color stabilizer | Fiber color data | | | |
|---|---|---|---|---|---|
| | | Original | | Heated | |
| | | Brightness | Purity | Brightness | Purity |
| 1 | Control | 88.2 | 5.9 | 72.4 | 17.9 |
| | 0.20 | 89.4 | 5.6 | 76.2 | 16.0 |
| 2 | Control | 85.3 | 10.3 | 73.0 | 18.9 |
| | 0.05 | 89.5 | 7.8 | 77.9 | 15.9 |
| | 0.10 | 90.6 | 7.1 | 79.8 | 14.3 |
| | 0.15 | 90.9 | 7.0 | 79.4 | 14.9 |
| 3 | Control | 82.6 | 10.5 | 75.3 | 15.1 |
| | 0.10 | 85.5 | 8.6 | 77.5 | 13.6 |
| | 0.20 | 87.8 | 6.9 | 79.7 | 12.6 |
| 4 | Control | 89.6 | 5.5 | 84.8 | 9.5 |
| | 0.05 | 91.8 | 4.8 | 87.1 | 8.1 |
| | 0.10 | 91.1 | 4.8 | 86.8 | 8.2 |
| | 0.20 | 91.1 | 5.1 | 86.3 | 7.9 |

I claim:

1. A heat stable polymer made up of at least 60 weight percent of acrylonitrile copolymerized with up to 40 weight percent of an ethylenically unsaturated comonomer with a heat stabilizing organophosphorus compound not exceeding 5 weight percent of said polymer, said compound being represented by the general formula:

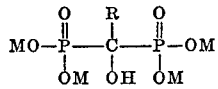

wherein M is a member selected from the group consisting of hydrogen, sodium, potassium, and R is a member selected from the group consisting of an alkyl radical having one to eleven carbon atoms, a phenyl radical, and an alkyl phenyl radical containing no more than eight carbon atoms.

2. A method as recited in accordance with claim 1 wherein the organophosphorous compound is 1-hydroxyethane 1,1-diphosphonic acid.

3. A method as recited in accordance with claim 1 wherein the monomers are selected from the group consisting of vinyl halides, vinylidene halides, vinyl esters, vinyl benzene, vinyl sulfonic and carboxylic acids and their salts.

References Cited

UNITED STATES PATENTS

| | | | |
|---|---|---|---|
| 3,410,819 | 11/1968 | Kourtz et al. | 264—182 |
| 3,149,089 | 9/1964 | Hayes | 260—45.7 |
| 2,748,169 | 3/1957 | Slocombe | 260—45.7 |
| 3,092,651 | 6/1963 | Friedman | 260—932 |
| 3,664,975 | 5/1972 | Kerst | 260—45.7 |
| 3,474,047 | 10/1969 | Pelletier | 260—45.7 |

DONALD E. CZAJA, Primary Examiner

V. P. HOKE, Assistant Examiner

U.S. Cl. X.R.

8—177 R; 260—29.6 AN, 29.6 MP, 88.7 D, 88.7 B, 88.7 E